March 13, 1962     W. E. PONEMON     3,025,201
ELECTRICALLY NON-CONDUCTIVE STRUCTURAL ELEMENT
Filed July 15, 1957
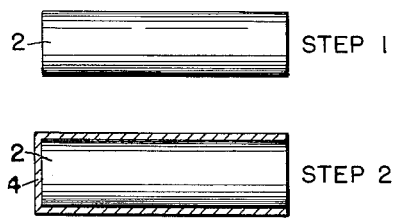
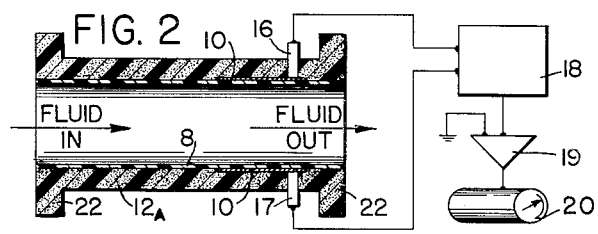
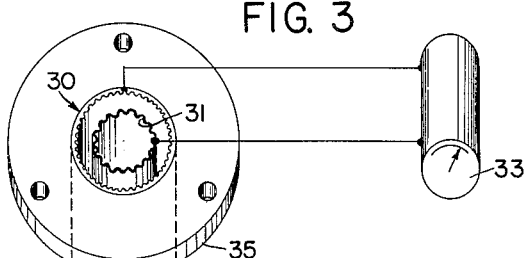
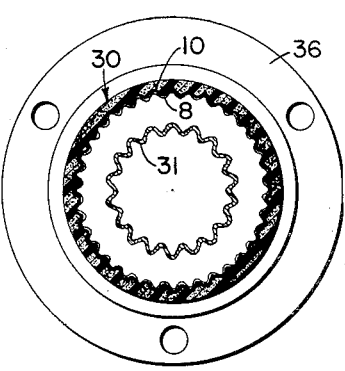
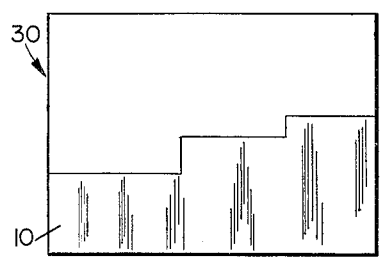
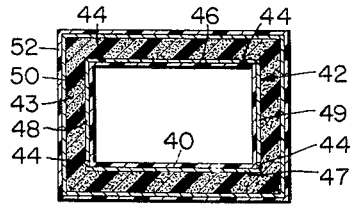
INVENTOR.
WARREN PONEMON
BY
Leonard H. King

United States Patent Office 3,025,201
Patented Mar. 13, 1962

3,025,201
ELECTRICALLY NON-CONDUCTIVE STRUCTURAL ELEMENT
Warren E. Ponemon, Jamaica, N.Y., assignor to Lamtex Industries, Inc., Westbury, N.Y.
Filed July 15, 1957, Ser. No. 671,835
13 Claims. (Cl. 156—294)

This invention relates to rigid electrically non-conductive members suitable for use as structural members and having embedded therein thin electrically conductive films.

In certain application capacitive probes are utilized for sensing liquid level or the composition of a fluid existing between the probe electrodes. In general, such electrodes have in the past been formed of fairly substantial metal masses. In order to protect the metal and to prevent short circuiting of electrodes by electrically conductive fluids, it has been common practice to coat the electrodes with an insulating material such as a synthetic resin.

The use of such probes in capacitive fuel gaging equipment is disclosed for example in Leo A. Weiss Patent No. 2,789,435. Another application for such equipment has been in common carrier pipe lines utilized for transporting petroleum products. In such pipe lines it is necessary for the operators to determine when a change in the fluid passing through the line occurs so as to determine the beginning and end of a particular shipment. This is accomplished by sensing the change in dielectric constant as a new batch passes the check point.

The disadvantages of the prior art devices have included high weight, complexity and resulting high manufacturing cost, bulkiness and other disadvantages.

There is disclosed hereinafter an improved sensing device which utilizes a thin metal film encapsulated in a reinforced synthetic resin body. The device of this invention and the process of making same have many other advantages, as for example, light weight. They may be employed as structural elements, such as a supporting rib for an aircraft wing and at the same time as a sensing capacitor. As will be disclosed hereinafter, they are readily and inexpensively produced. The devices of this invention permit the use of smaller quantities of metal than heretofore required in prior art sensing capacitors, which is an important asset during times of national emergency when metals are normally in short supply. Accordingly, it is an object of this invention to provide an improved method for making structural members having incorporated therein a thin electrically conductive film.

It is a further object of this invention to provide a lightweight capacitive probe.

Still another object of this invention is to provide an improved electrically non-conductive structural member having incorporated therein a thin electrically conductive element supported by the structural member.

A further object of this invention is to provide a means for encapsulating a thin electrically conductive film in a hollow synthetic resin body.

An object of this invention is to provide a novel capacitive sensing probe suitable for use in pipe lines.

Still another object of this invention is to provide an improved capacitive probe suitable for use in capacitive type liquid quantity measuring systems.

Still other objects and advantages of this invention will be in part obvious and in part pointed out with particularity as the following description proceeds taken in conjunction with the accompanying drawings.

In the drawings:

FIGURE 1 is a process sheet showing various steps of the instant invention.

FIGURE 2 shows partially broken away the novel device of this invention embodied in a pipe line sensing element.

FIGURE 3 discloses pictorially and partially schematically a liquid level sensing device employing the product of this invention.

FIGURE 4 is a cross sectional view taken through 4—4 of FIGURE 3.

FIGURE 5 is a developed view, of the interior, of the outer tube shown in FIGURE 3.

FIGURE 6 is a cross-sectional view of a preferred liquid level sensing probe.

The process of manufacture is shown carried out step by step in FIGURE 1.

Step 1.—There is shown a master mandrel 2, conforming in outside shape to the inner surface of a desired hollow element. The master mandrel 2 is formed of wood, metal or other conveniently worked material.

Step 2.—Master mandrel 2 is then copied as a female master mold 4, using plaster, plastic, or any of the other suitable conventional mold making materials commonly employed for this purpose, by casting the mold making material around the master mandrel 2.

Step 3.—Into the master mold 4 there is then cast a mandrel 6, utilizing a low melting point material such as Wood's metal or a thermoplastic resin such as polystyrene. Step 3 shows meltable mandrel 6 removed.

Step 4.—Meltable mandrel 6, resulting from step 3, is then coated with a layer of synthetic resin 8.

Step 5.—Although not essential, it is preferred that the layer of resin be cured at the normal curing temperatures for such resin. In many cases setting at room temperature to a tacky condition is adequate. If epoxy resins are employed bringing the resin to a "B" stage is advantageous.

Step 6.—A layer of metal 10, in the desired configuration, is deposited on coating 8 by means of silk screening techniques, use of decals, electroplating or by the use of a pressure sensitive adhesive foil layer (if the resin layer is tacky then untreated metal foil will adhere).

Step 7.—Tubes of woven glass fiber 12 are now stretched over the coated mandrel. A sufficient number of such tubes or sleeve-like woven tubular members are stretched over the mandrel in concentric layers so as to provide a layer of the thickness required.

Step 8.—The layers of glass fiber (or other suitable reinforcing fiber) are then impregnated with epoxy resin, forming homogeneous body 12a.

Step 9.—The impregnated body 12a is then cured in an oven at the normal curing temperature for the epoxy or other resin employed.

The procedure of steps 7 through 9 is described and claimed in my copending application, entitled "Reinforced Member," Serial No. 611,050, filed approximately September 20, 1956.

Prior to impregnation, terminal member 14 may be attached to the metal layer 10 and positioned so that in subsequent steps the terminal is encapsulated by synthetic resin and permanently fixed in position.

In a final step, step 10, the meltable mandrel is removed by heating to the melting point so as to provide a hollow structure.

In FIGURE 2 there is shown in cross section an element suitable for insertion in a pipe line. This element consists of tubular body 12a having embedded therein thin metallic plates 10 by means of the process of this invention. Terminals 16 and 17 provide means for connecting the two plates to external circuit 18 which consists of a capacitance bridge, amplifier 19, and indicating means 20. Variations in dielectric constants of fluids passing through the pipe line cause a change in the reading of indicator 20. In place of indicator 20 conventional relay and/or automatic control devices may be employed.

A common pipe line transports a variety of fluids in order to enable operating personnel to segregate individual shipments of fluids and a sensing and indicating device is necessary. The apparatus disclosed herein is advantageous for this purpose because the sensing probes are an integral part of the pipe line and are not subject to damage. Flanges 22 permit coupling of the special sensing section into the pipe line.

In FIGURE 3 there is shown pictorially an improved sensing device suitable for use in capacitive type liquid level measuring systems. In such systems variations in the level of the liquid between the electrodes 30 and 31 while partially immersed in a liquid results in a change in dielectric constant of the medium between the two electrodes 30 and 31. In turn this change is sensed by indicator 33. The dielectric constant of the medium changes since a substantial difference exists between the dielectric constant of liquids commonly employed and that of air. In order that such a system be responsive to changes in quantity rather than changes in level particularly where employed in combination with a tank of varying cross section as is commonly found aboard aircraft, it is common practice in the industry to "characterize" the shape of the capacitive plates in order to compensate for such variations in the cross section of the tank. In general, it is desirable to have a high running capacitance, that is a high capacitance per unit length. The process of this invention lends itself to the formation of the complex corrugated shape shown in FIGURE 4 which provides a high cross sectional area of electrode in a small size. In addition to the corrugated shape, the device may incorporate the aforementioned characterized shape as shown in FIGURE 5, which is a development of the inner surface of the outer tube 30. The embedded thin sheet of metal 10 may be observed to have an area which varies in accordance with a particular function. Inner tube 31 may be an aluminum extrusion or metallized plastic. As discussed in connection with the embodiment of the invention employable in a pipe line, terminal members may be integrally molded into the body.

Despite the light weight of this structure, it has highly desirable structural properties and is extremely rigid. Suitable flanges 35 and 36 may be formed at the time of molding so as to provide means for combining the member into a structure such as a wing of an aircraft wherein it may serve the dual function of sensing probe and structural member. While the process has been described in terms of a meltable mandrel, it is to be understood that using suitable mold release agents a conventional nonmeltable mandrel may be used.

The thickness of the resin layer 8 will be determined by the intended application of the device. In a level indicator for a fuel gage, where little or no wear is to be expected, a few thousandths of an inch is adequate. In a pipe line a quarter-inch layer may be deposited.

A preferred capacitive sensing electrode for purposes of liquid quantity measurement is shown in FIGURE 6. This electrode may be made by coating a rectangular mandrel with a thin layer of epoxy resin 40 and partially polymerizing said resin to the "B" stage. The resin is then metallized by the chemical or vacuum deposition of copper, silver, gold, nickel or other appropriate metal. As an alternative the resin may be coated with graphite and then electroplated as is conventional in the recording art.

The layer 42 is then electroplated to increase its thickness. Copper is a preferred metal for this purpose. Grooves 44 are cut through the copper layer 42 so as to isolate sections 46, 47, 48 and 49 from each other. The grooves are preferably formed by photo-chemical etching techniques. This method may be used to provide a shaped pattern as is required for a "characterized capacitor." A plurality of concentric layers of woven fibre glass tubing is then stretched over the mandrel. Epoxy resin is then impregnated into the interstices of the glass fibres to form a monolithic structure 43.

Suitable connectors (not shown), which may be integrally molded into the structure, make contact with metal sections 46, 47, 48 and 49 and permit connection to external circuits. Metal sections 46 and 47 are the electrodes forming the capacitor. Section 46 is connected, in appropriate circuits, to a point of high impedance (with respect to ground). Section 47 is normally connected to a point of low impedance.

It is preferred that an electrostatic shield be formed on the outside of the capacitor. This may be a chemically deposited layer of metal 50. Optionally, a protective coating of epoxy resin 42 may be deposited over layer 50.

The sensing electrode just described has many advantages over the prior art devices such as low cost, light weight and compact configuration. A most important advantage is that a one piece article results thus eliminating parts which can loosen under vibration or become misaligned.

In still another embodiment of the invention a highly polished steel mandrel is coated with graphite powder which serves as an electrically conductive mold release agent. A layer of metal is then electroplated onto the graphite. Copper is a suitable metal for this purpose. The metal plate is then etched to provide the desired pattern. Conventional photo-chemical etching methods may be employed. The metal layer is then covered by a reinforcing fiber, preferably in woven form. The fiber is then impregnated with resin as discussed earlier.

It is to be noted in this last embodiment that the mandrel was not precoated with resin. Instead of the chemical deposition and etching procedure, suitable shaped metal foil pieces may be placed onto the mandrel and then encapsulated as taught herein.

Having thus described the best embodiment of my invention presently contemplated, it should be understood that various changes may be made by those skilled in the art upon consideration of this disclosure without departing from the spirit of the invention.

What is claimed is:
1. The process of making rigid reinforced synthetic resin articles containing electrically conductive elements comprising the steps of coating a removable mandrel with a layer of resin in liquid form, curing said layer of resin, depositing a thin layer of a conductive material on said layer of resin, covering said layer of resin and said layer of conductive material with at least one layer of a fibrous glass material, impregnating said fibrous material with a hardenable resin in liquid form and hardening said resin to form a monolithic structure comprising said layer of resin, said conductive material, said fibrous material and said resulting hardened resin.

2. The process of claim 1 wherein said conductive material is a metal foil.

3. The process of claim 1 wherein said conductive material is deposited by screening.

4. The process of making rigid reinforced synthetic resin articles containing electrically conductive elements comprising the steps of coating a removable mandrel with a layer of resin in liquid form, curing said layer of resin, depositing a thin layer of a conductive material on said layer of resin, covering said layer of resin, and said layer of conductive material with at least one layer of a tubular woven fibrous glass material, impregnating said fibrous material with a hardenable resin in liquid form and hardening said resin to form a monolithic structure comprising said layer of resin, said conductive material, said fibrous material and said resulting hardened resin.

5. The process of making rigid reinforced synthetic resin articles containing electrically conductive elements comprising the steps of coating a removable mandrel with a layer of resin in liquid form, curing said layer of resin, depositing a thin layer of metal on said layer of resin, covering said layer of resin and said layer of conductive metal with at least one layer of a fibrous glass material, impregnating said fibrous material with a hardenable resin in liquid form and hardening said resin to form a monolithic structure comprising said layer of resin, said metal, said fibrous material and said resulting hardened resin.

6. The process of making rigid reinforced synthetic resin articles containing electrically conductive elements comprising coating a removable mandrel with a layer of resin in liquid form, curing said layer of resin, depositing a layer of a conductive material on said layer of resin, covering said layer of resin and said layer of conductive material with a plurality of concentric layers of a tubular woven fibrous glass material, impregnating said fibrous material with a hardenable resin in liquid form and hardening said resin so as to form a monolithic structure comprising said layer of resin, said conductive material, said fibrous material and said resulting hardened resin.

7. The process of forming electrically conductive articles encapsulated in a rigid hollow tubular member comprising the steps of making a master mandrel conforming in shape to the interior of said hollow article, forming a hollow mold having an interior configuration conforming to that of said master mandrel, forming a deformable mandrel composed of a heat softenable material in said mold, coating said deformable mandrel with a layer of synthetic resin in liquid form solidifying said resin, applying a thin electrically conductive coating to portions of said resin layer, covering said resin layer and said electrically conductive coating with a fibrous glass material, encapsulating said fibrous material, said conductive coating and said resin layer with a resin adherent to said hardened liquid resin layer and hardening said hardenable resin to form a monolithic structure.

8. The process of forming electrically conductive articles encapsulated in a hollow tubular member comprising the steps of making a master mandrel conforming in shape to the interior of said hollow article, forming a hollow mold having an interior configuration conforming to that of said master mandrel, forming a deformable mandrel composed of a heat softenable material in said mold, coating said deformable mandrel with a layer of synthetic resin in liquid form solidifying said resin, applying a thin electrically conductive metal layer to portions of said resin layer, covering said resin layer and said electrically conductive coating with a fibrous glass material, encapsulating said fibrous material, said metal layer and said resin layer with a hardenable liquid resin adherent to said resin layer and hardening said hardenable resin to form a monolithic structure.

9. The process of forming electrically conductive articles encapsulated in a hollow tubular member comprising the steps of making a master mandrel conforming in shape to the interior of said hollow article, forming a hollow mold having an interior configuration conforming to that of said master mandrel, forming a deformable mandrel composed of a heat softenable material in said mold, coating said deformable mandrel with a layer of synthetic resin in liquid form solidifying said resin, applying a thin electrically conductive coating to portions of said resin layer, covering said resin layer and said electrically conductive coating with a plurality of concentric layers of a tubular woven fibrous glass material, encapsulating said fibrous material, said conductive coating and said resin layer with a hardenable liquid resin adherent to said resin layer and hardening said hardenable resin to form a monolithic structure.

10. The process of making reinforced synthetic resin articles incorporating electrically conductive elements comprising the steps of coating a removable mandrel with a layer of graphite, depositing a thin layer of a conductive material on said layer of graphite, covering said layer of conductive material with at least one layer of a fibrous glass material, impregnating said fibrous material with a hardenable liquid resin in liquid form and hardening said resin to form a monolithic structure comprising said conductive material, said fibrous material and said resin.

11. The process of claim 10 wherein said conductive material is a metal.

12. The process of making reinforced synthetic resin articles containing electrically conductive elements comprising the steps of coating a removable mandrel with a layer of graphite, depositing a thin layer of a conductive material on said layer of graphite, covering said layer of conductive material with at least one layer of a tubular woven fibrous glass material, impregnating said fibrous material with a hardenable liquid resin in liquid form and hardening said resin to form a monolithic structure comprising said conductive material, said fibrous material and said resin.

13. The process of making reinforced synthetic resin articles containing electrically conductive elements comprising the steps of coating a removable mandrel with a layer of metal, covering said layer of metal with at least one layer of a fibrous glass material, impregnating said fibrous material with a hardenable liquid resin and hardening said resin to form a monolithic structure comprising said layer of metal, said metal, said fibrous material and said resin.

References Cited in the file of this patent

UNITED STATES PATENTS

| | | |
|---|---|---|
| 1,912,223 | Ruben | May 30, 1933 |
| 1,924,711 | Edenburg | Aug. 29, 1933 |
| 2,307,488 | Clark | Jan. 5, 1943 |
| 2,387,759 | Jarvis | Oct. 30, 1945 |
| 2,582,399 | Smith | Jan. 15, 1952 |
| 2,607,825 | Eisler | Aug. 19, 1952 |
| 2,675,421 | Dexter | Apr. 13, 1954 |
| 2,688,177 | Wagner | Sept. 7, 1954 |
| 2,723,705 | Collins | Nov. 15, 1955 |
| 2,740,732 | Peck et al. | Apr. 3, 1956 |
| 2,754,478 | Goldsmith | July 10, 1956 |
| 2,759,134 | Sullivan | Aug. 14, 1956 |
| 2,760,127 | Duncan | Aug. 21, 1956 |

UNITED STATES PATENT OFFICE
CERTIFICATE OF CORRECTION

Patent No. 3,025,201                 March 13, 1962

Warren E. Ponemon

It is hereby certified that error appears in the above numbered patent requiring correction and that the said Letters Patent should read as corrected below.

Column 1, line 13, for "application" read -- applications --; column 5, line 28, before "resin", second occurrence, insert -- hardenable liquid --; line 29, strike out "hardened liquid --.

Signed and sealed this 26th day of March 1963.

(SEAL)
Attest:

ESTON G. JOHNSON                 DAVID L. LADD
Attesting Officer                 Commissioner of Patents